United States Patent [19]

Maeda et al.

[11] Patent Number: 4,642,701
[45] Date of Patent: Feb. 10, 1987

[54] DEVICE OF SWITCHING A SCANNING BEAM DIAMETER

[75] Inventors: Kiyoshi Maeda, Takatsuki; Tsutomu Ueyama, Shijonawate, both of Japan

[73] Assignee: Dainippon Screen Mfg. Co., Ltd., Kyoto, Japan

[21] Appl. No.: 675,706

[22] Filed: Nov. 28, 1984

[30] Foreign Application Priority Data

Dec. 6, 1983 [JP] Japan .................. 58-231109

[51] Int. Cl.$^4$ ................... H04N 1/21; G01D 9/42
[52] U.S. Cl. ........................ 358/296; 346/108
[58] Field of Search ............... 358/296; 346/107 R, 346/108, 160, 109, 76 L

[56] References Cited

U.S. PATENT DOCUMENTS 3,657,473  4/1972  Corcoran ............... 346/108
4,060,323  11/1977 Hirayama ............... 346/76 L
4,539,478  9/1985  Sano ...................... 346/108

Primary Examiner—E. A. Goldberg
Assistant Examiner—Mark Reinhart
Attorney, Agent, or Firm—Brumbaugh, Graves, Donohue & Raymond

[57] ABSTRACT

A device for switching a scanning beam diameter, incorporated into a picture image scanning and recording device, which switches the diameter of the scanning beam in response to the density of number of scanning lines. The beam from a scanning light generator is branched at least into two optical paths and the diameter of at least one of the branched beams is magnified by a beam expander. The branched optical paths are unified again into a single path and, in order to pass the beam through one desired optical path a shutter device is provided.

8 Claims, 2 Drawing Figures

… (a), where: f is a focal length of the objective and λ is the wavelength of the laser beam.

DEVICE OF SWITCHING A SCANNING BEAM DIAMETER

BACKGROUND OF THE INVENTION

The present invention relates to a device for switching the diameter of a scanning beam in response to a selection of the number of scanning lines of a picture image scanning and recording apparatus.

In graphic art processing, since a secondary copy for printing form, or a printing plate prepared from a copy by means of a photographic system using a camera requires great difficulty in making a correction to reproduce contrast of a picture image on the copy as it is or to emphasize its details, the picture image scanning and recording apparatus (hereinafter referred to as "scanner") easily enables such correction in a desired manner by operating an electronic circuit, has come to be increasingly used.

Although it has been conventionally regarded as difficult in this kind of scanner, particularly in a scanner of a mechanical plane system, to increase processing speed, an adoption of polygon mirror scanning and galvano mirror scanning has solved the foregoing difficulty. With the expansion of using such scanning methods, advantages obtained by above-mentioned reproduction of tone and emphasis of details are utilized efficiently, so that, in addition to a scanner for a screen with comparatively rougher lines which has been hitherto used mainly for preparation of secondary copy for the newspaper, a scanner capable of giving rise to a number of finer scanning lines has been demanded, with increasing tendency to use graphic printing more frequently.

SUMMARY OF THE INVENTION

Accordingly, an object of the present invention is to provide a device capable of changing adequately the diameter of a scanning beam in a switching manner in response to a selection of the number of scanning lines.

In order to achieve the foregoing object, a device for switching a scanning beam diameter, according to this invention, in which a copy is photoelectrically scanned to get picture image projection, which information is subject to processing, and a picture image in response to the copy is scanned and recorded on the basis of a result of the processing, includes means for branching a beam from a scanning light generator into at least two optical paths, beam diameter changing means disposed on at least one of said optical paths, beam rejoining means by which said optical paths are rejoined into one optical path, and a shutter permitting a beam to pass through only one path, so that a scanning beam may be switched according to the selected number of scanning lines.

BRIEF DESCRIPTION OF THE DRAWINGS

Other features and advantages of the present invention will become apparent in the course of the following description of preferred embodiments of the present invention given in conjunction with the accompanying drawings wherein.

DESCRIPTION OF THE PREFERRED EMBODIMENTS

Generally, as for a diameter of a beam projected from an objective (projecting lens) to a projecting surface in the case where a laser is used as a light source of the scanning beam, when establishing that a diameter of a laser beam incident upon the objective is D and a diameter of a scanning beam converged as much as possible on a focal plane, i.e. a diameter of a spot where the image is formed on the projecting surface is $d_o$, such a relation is expressed in the formula, $do=(4\pi)(f\cdot\lambda/D)$ . . . (a), where: f is a focal length of the objective and λ is the wavelength of the laser beam.

Figure 2:
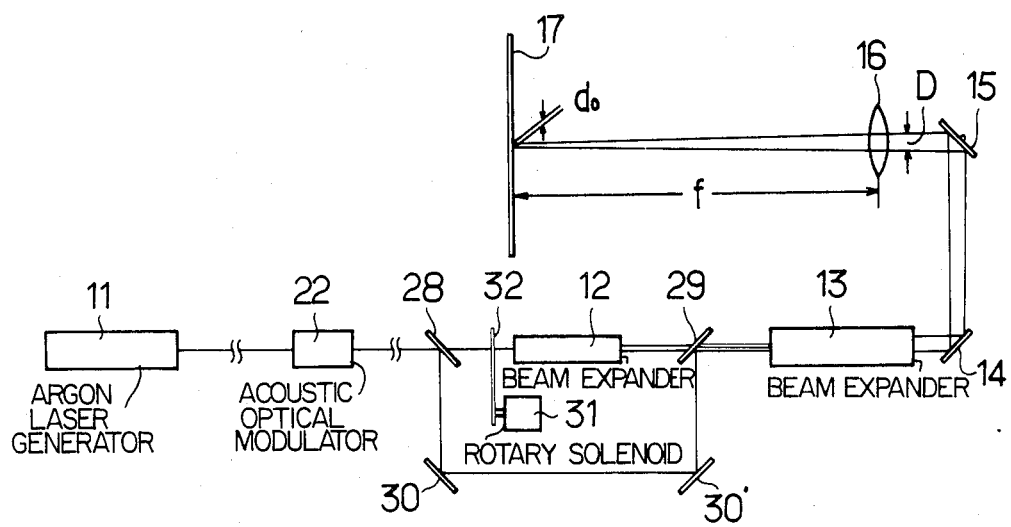
FIG. 2 is an explanatory view of the optical system with a diameter of a scanning beam changed in a switching manner.

As shown in FIG. 2, when the parallel focusing beam of diameter D is deflected by a galvano mirror (15) for oscillating a plane reflecting mirror around its perpendicular central supporting axis and a image-formation spot on the projecting surface (17) is moved, a beam scanning is performed as seen from the formula (a). Accordingly, when decreasing both f and λ while increasing D, it is possible to scan with a finer beam, resulting in an increase in the number of scanning lines, and eventually improving resolving power of a recorded picture image.

Concerning the scanning beam for recording which has a direct relationship with the resolution power of the recorded picture image, it is to be noted that since the projecting surface (17) is made of a sensitive film, blue-colored argon laser which is rather short in wavelength, e.g. 488 nm, is used to make λ smaller, whereas f which requires a length to some extent from the standpoint of a relation between a necessary recording width (scanning width in a principal scanning direction) and a swinging motion angle of the galvano meter mirror, cannot be made too short. Therefore, in order to increase D to be left as an adjustable element, a beam expander (13) of large magnification is provided, thereby increasing a diameter of the parallel focusing beam incident on the objective (16).

According to the device of this embodiment, by adding a beam expander (12) of two times magnification to a beam expander (13) of 15 times magnification, a laser beam projected from an argon laser generator (11), which is the parallel focusing beam having about 0.63 m in diameter before being projected into both beam expanders (12) and (13), is changed to be a parallel focusing beam of 19 mm in diameter, i.e. about 30 times as long as the former before being projected into the objective (16), whereby the diameter $d_o$ of the image-formation spot is narrowed. The argon laser beam is adapted to pass through a by-pass by interposing the beam expander (12) between half mirrors (28) and (29) and providing a pair of reflecting mirrors (30) and (30') so that the argon laser beam is directly incident upon the beam expander (13), and, furthermore, these two optional paths can be switched by a shutter (32) actuated by a rotary solenoid (31). Thus, two recording light beams of 19 mm and 9.5 mm in diameter can be obtained by this device, resulting in proper use of the number of scanning lines in response to the necessity such that, in the scanning by the former recording light beam, 1,500 lines/inch are used, while in the scanning by the latter 750 lines/inch are used.

Figure 1:
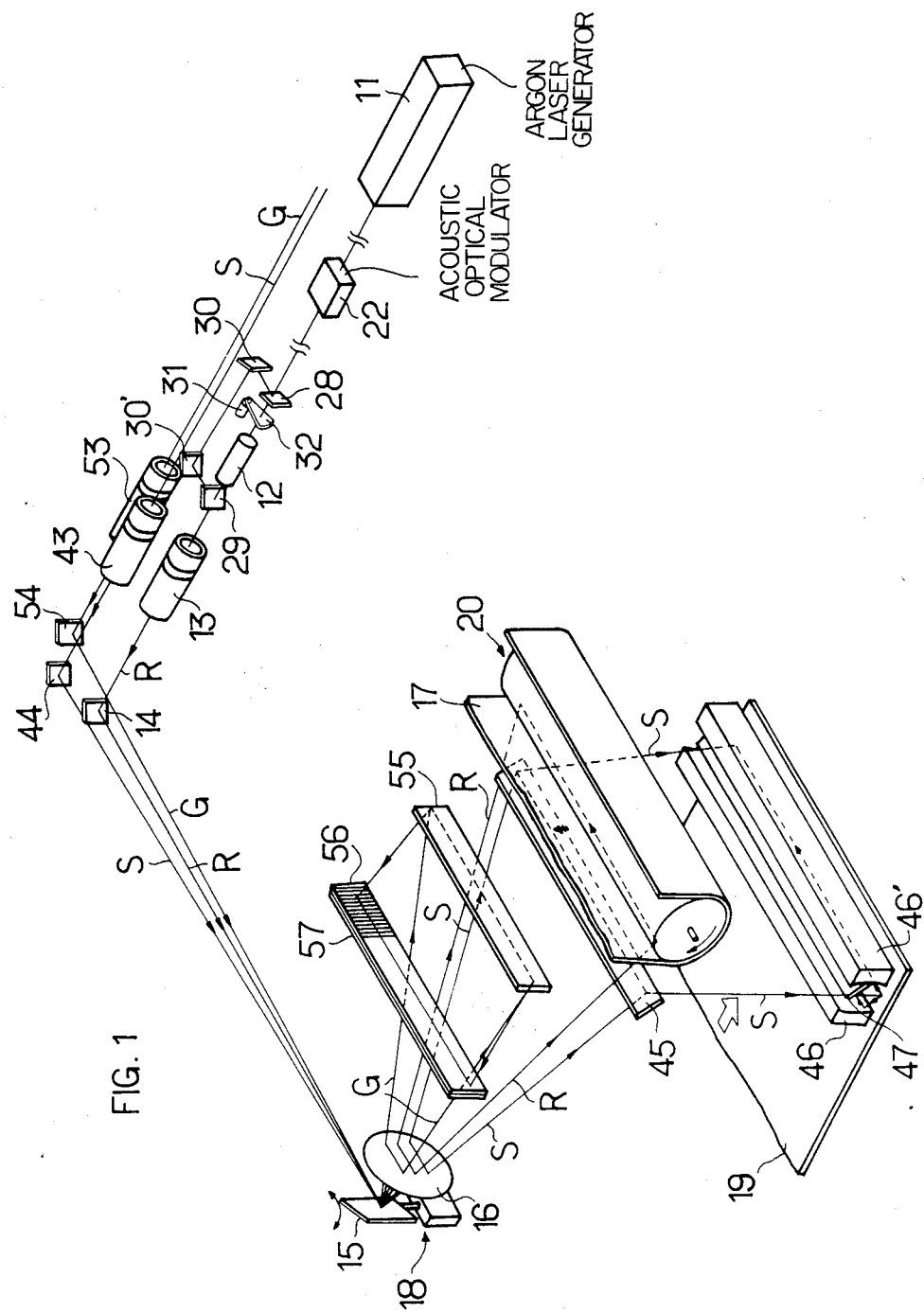
FIG. 1 is a perspective view typically illustrating a construction of a picture image scanning and recording device into which a device as an embodiment according to the present invention is incorporated.

The embodiment of the device shown in FIG. 1 has the galvano mirror (15) held on the perpendicular central supporting axis and possesses three optical systems for the light beam, i.e. the above-mentioned optical system (R) for recording (printing), the optical system (S) for picking up the picture image on the copy, and the optical system (G) for detecting the position of scanning. They perform both the deflection of beam and the beam scanning by means of a galvano mirror device (18) which causes the foregoing supporting axis to take a freely swinging motion at a high speed by a certain angle in such a clockwise or counterclockwise direction as shown by the arrow. In the optical system (R) for recording, the laser beam projected from the light source, i.e. the argon laser generator (11), is stopped down by a lens (not shown) to be incident upon an acoustic optical modulator (hereinafter A.O.M.) (22). The modulated light output from the A.O.M. (22) is adapted to be a parallel focusing beam by means of an optical device (not shown) so as to be incident upon the device for switching a scanning beam diameter according to the present invention. The present embodiment of the device for switching the scanning beam diameter according to the present invention comprises the half mirror (28) dividing the foregoing parallel focusing beam into two parts, total reflecting mirrors (30) and (30') arranged on a reflecting optical axis (hereinafter referred to as by-pass optical path) from the half mirror (28), the beam expander (12) arranged on the optical axis (hereinafter referred to as direct-acting optical path) which is transmitted through the half mirror (28), the half mirror (29) adapting the by-pass optical path to fall in line with the direct-acting optical path, and the shutter device (32) for intercepting alternatively one of the two optical paths. The beam from the A.O.M. (22) is divided into transmitted light and reflected light by means of the half mirror (28); the transmitted light has its diameter magnified two times by the beam expander (12) is subsequently transmitted through the half mirror (29), and passes the second beam expander (13) having its diameter further magnified 15 times, so that it is adapted to be projected on the reflecting mirror (14) as the parallel focusing beam for recording. On the other hand, the parallel focusing beam which is reflected by the half mirror (28), while keeping its diameter as it was, passes the by-pass optical path formed by a pair of reflecting mirrors (30) and (30'), joins the foregoing direct-acting optical path through the half mirror (29), and goes through the second beam expander (13) so that it is adapted to be projected on the reflecting mirror (14) as the parallel focusing beam for recording the diameter which is ½ that of the condition where it passed the first beam expander (12). The beam optical system for recording (R) is provided with the shutter (32) actuated by the rotary solenoid (31) between the half mirror (28) and the beam expander (12), so that when the shutter (32) intercepts the direct-acting optical path as shown in the drawing, the parallel focusing laser beam passes the by-pass optical path, and, as mentioned above, it is projected on the beam expander (13) with its diameter kept as it was, whereas when the shutter (32) intercepts the by-pass optical path, the parallel focusing laser beam which has its diameter magnified 30 times, is projected on the reflecting mirror (14). Thereby, the diameter of the parallel focusing beam for recording which is adapted to be incident by way of the galvano mirror (15) upon the objective (16) can be easily switched into two forms without the necessity of adjusting the optical axis.

The beam for recording (14) is reflected by the reflecting mirror (14) and projected in parallel with a base stand (not shown), in other words, upon the center of the galvano mirror (15) within the horizontal plane. It then is deflected by means of the freely swinging motion of the galvano mirror (15) and, becomes the scanning beam for recording in the main scanning direction, and is projected on the objective (16). The scanning beam from the galvano mirror (15) is adapted to scan the surface of the recording film (17) being positioned on the focal plane, working as a scanning beam whose diameter is sufficiently stopped down by the objective (16).

The optical system (S) for picking up a picture image on the copy, and the optical system (G) for detecting the position of scanning are separately incident from a laser generator (not shown) by way of a fixed optical device (not shown) upon beam expanders (43) and (53), and beams from each of the beam expanders (43) and (53) are projected on the center of the galvano mirror (15) by mirrors (44) and (54). As for the laser generator, both branching the beam from a single laser generator into 3 optical systems and providing individual generators for the optical systems (R), (S), and (G) respectively may be acceptable. Each of the optical systems (R), (S) and (G) which are incident upon the center of the galvano mirror (15) is, as seen from the drawings, provided such that two optical systems (S) and (G) form making a slight angle to the optical system for recording (R) so that any interference of one optical system with another may be avoided. The beam for picking up the picture image on the copy (S) is, as shown by the drawing, adapted to scan the copy (19) being arranged on the focal plane of the objective (16) by way of the objective 16 and the mirror (45).

The reflecting mirrors (46) and (46') which are arranged horizontally along the main scanning direction of the copy (19) are located a little above the copy (19). Each of their inside faces has a concave-curved surface partially forming ellipse-curved surfaces, the major axes of which are inclined from the perpendicular direction to the side opposite to a subscanning direction as well as having one of their faces to be located on the surface of the picture image's copy. For this reason, any reflecting light of the scanning beam for pick up from the surface of the picture image's copy (19) is concentrated upon another focal line of the reflecting mirrors (46) and (46'). In order to avoid interference with the scanning beam for pick up, along the foregoing focal line, a light receiving element plate (47) formed by arranging continuously a multiplicity of photodiodes or liner-shaped CCD array elements is provided, and the quantity of reflecting light in response to density of the picture image on the copy which is concentrically received in the said element plate (47) is converted proportionally to an electric signal by means of the individual light receiving elements and input into an electronic circuit (not shown).

In accordance with the program for the emphasis of details, etc. which is input into the foregoing electronic circuit in advance, picture image information being input from the individual light receiving element is processed to become a signal for driving the A.O.M. (22) of the beam optical system for recording, such a signal being output from the electronic circuit to the A.O.M. (22).

The beam (G) for detecting the position which is reflected by the galvano mirror (15), as shown in the drawing is adapted to be incident by way of the objective (16) and the mirror (55) upon a grating (56).

In that case, since the length of the optical path from the objective (16) to the grating (56) is substantially equal to the focal distance of the objective, the scanning of the grating (56) is performed by the light flux being sufficiently stopped down. On the back side of the grating (56), the width of which is equal to the recording width, the light receiving element (57), in which a majority of elements for receiving the light are individually arranged to a clearance between the gratings (56) and (56'), is provided, and every time when the individual light receiving elements catch the scanning beam in sequence, the scanning beam is input as an electric signal into the foregoing electronic circuit.

Since the picture image scanning and recording apparatus into which the device for switching the scanning beam diameter according to the present invention is incorporated takes the foregoing arrangement, when the by-pass optical path is intercepted by the shutter, the recording beam has its light flux magnified as much as possible by two beam expanders and such recording beam performs the scanning as the parallel focusing beam, the number of scanning lines as fine as 1,500 lines/inch is obtained, for example, and the resolving power of the picture image can be enhanced, thereby facilitating the preparation of a printing plate which requires a large number of lines or the secondary copy. Furthermore, when the substantial optical path is intercepted by the shutter, the recording beam has its light flux magnified only by one beam expander so that it is adapted to perform the scanning by the parallel focusing beam, the number of scanning lines as rough as 750 lines/inch is obtained so that the preparation of the form for newspaper, etc., or the secondary copy, can be promptly performed. From that view, since the conversion of the diameter of the beam for recording can be made only by switching the shutter, the adjustment of the optical axis, which is extremely troublesome work, is not needed at the switching of the shutter, whereby an advantage of being able easily to use properly one device in two manners in response to the necessity is insured.

Although the foregoing embodiment has described the case where a device for switching the scanning beam diameter according to the present invention is applied to an optical system (R) for recording, said device may be applied to other optical systems (S) and (G) as a matter of course.

Under the foregoing embodiment, although the beam from the laser generator is branched into two parts and both of them are alternately intercepted by the shutter device, it may be also acceptable to set a plurality of by-pass optical paths.

What is claimed is:

1. An apparatus for recording an image on a photosensitive material, comprising:
   a light source which emits a beam for sensitizing the photosensitive material;
   means for modulating the beam emitted from said light source;
   means for branching said beam into at least two branched beams along two optical paths;
   means for expanding the beam diameter of said branch beams so that said beam diameter corresponds to scanning lines on the photosensitive material;
   means for rejoining said branched beams;
   a lens system for converging said beams onto the photosensitive material; and
   means, separated from the means for modulating, for alternatively passing a desired beam which is adapted for a desired scanning line to be recorded, said passing means being provided at said branched optical paths.

2. An apparatus as defined in claim 1, wherein said light source is a gas laser.

3. An apparatus as defined in claim 1, wherein said branching means includes a half mirror provided so as to branch said beam from said light source into at least one by-pass optical path formed by reflecting the beam with said half mirror and a direct-acting optical path formed by transmitting said beam through said half mirror.

4. An apparatus as defined in claim 1, wherein said beam diameter expanding means includes beam expanders.

5. An apparatus as defined in claim 1, wherein said branched beam rejoining means includes a half mirror arranged on any one of said optical paths.

6. An apparatus as defined in claim 1, wherein said means for alternatively passing a desired beam includes a shutter device.

7. An apparatus as defined in claim 6, wherein said shutter device is arranged on each of said optical paths between said beam branching means and said branched means rejoining means.

8. A device for switching a scanning beam diameter in an apparatus where a copy is photoelectrically scanned to get picture image information which is subject to processing, and a picture image is scanned in response to the copy and recorded on the basis of a result of the processing, the device comprising:
   a scanning light generator which emits a beam;
   beam branching means for branching said beam into at least two optical paths;
   beam diameter changing means for changing beam diameter disposed on at least one of said optical paths;
   beam combining means for forming said optical paths into one combined optical path; and
   a shutter device provided so as to permit a beam to pass on only one of said optical paths so that a scanning beam may be switched according to a selected number of scanning lines; means, separate from the shutter device, for modulating the beam emitted from the light generator.

* * * * *